Patented Jan. 2, 1923.

1,441,168

UNITED STATES PATENT OFFICE.

PAUL PETERS, OF MULLHEIM, SWITZERLAND.

PAINT COMPOSITION AND PROCESS OF MANUFACTURING THE SAME.

No Drawing. Application filed June 5, 1922. Serial No. 566,136.

*To all whom it may concern:*

Be it known that I, PAUL PETERS, a citizen of the German Republic, residing at Mullheim, Canton Thurgau, Switzerland, have invented new and useful Improvements in a Paint Composition and Process of Manufacturing the Same, of which the following is a specification.

The present invention relates to a new composition adapted to be used as a paint, for manufacturing impregnating material and insulating material and so on.

The new composition consists mainly of the suboxide of lead $Pb_2O$ and contains some oxide of lead $PbO$. The new composition is manufactured from the dross that is the residue of molten lead or lead compounds. The suboxide of lead may be produced by heating lead near to its melting point that is 327° C. and by passing air through it while the same is molten. The suboxide of lead is a dark greyish fine powder which when heated in air burns with a yellow flame to oxide of lead. Care is to be taken therefore by heating the lead or lead compound, that the temperature of the lead or metal dross does not reach its melting point. If metal dross be used to get the suboxide of lead other oxides of lead and impurities are usually contained in the product obtained. The latter is finely ground and may be mixed with a binder. If the process is properly carried out the suboxide of lead is predominant in the product.

The composition obtained may be used for many purposes, as a paint it forms a good protection against rust. The product may be used for manufacturing varnishes, jointing material, plastic substances, for the impregnation of fibres (organic fibres and asbestos). The ratio of suboxide of lead to the other oxides of lead may be varied by choosing the proper composition of metal dross to start with. An addition of calcium carbonate and of silica has proven to be of great advantage. By admixing these a calcium-lead compound is formed, and oxygen is given off.

What I wish to secure by Letters Patent is:—

1. The process of manufacturing a product adapted to be used as a protective paint against rust, as an insulating and as an impregnating agent, in which metal dross containing lead is heated to near the melting point of lead in the presence of oxygen and the product finely ground and mixed with a binder.

2. The process of manufacturing a product adapted to be used as a protective paint against rust, as an insulating and as an impregnating agent, in which metal dross containing lead is heated to near to the melting point of lead in the presence of oxygen and the product finely ground and mixed with a binder, calcium carbonate and silica being added.

In witness whereof I affix my signature.

PAUL PETERS.